UNITED STATES PATENT OFFICE.

ROBERT ABBOTT HADFIELD, OF SHEFFIELD, ENGLAND.

MAGNETIC COMPOSITION AND METHOD OF MAKING THE SAME.

No. 12,691. Specification of Reissued Letters Patent. Reissued Sept. 3, 1907.

Original No. 745,829, dated December 1, 1903, Serial No. 161,228. Application for reissue filed July 31, 1907. Serial No. 386,492.

*To all whom it may concern:*

Be it known that I, ROBERT ABBOTT HADFIELD, a subject of the King of Great Britain, and a resident of Sheffield, county of York, England, have invented certain new and useful Improvements in Magnetic Compositions and Methods of Making the Same, of which the following is a specification.

My invention relates to material having magnetic and electrical properties suitable for use in various electrical apparatus, such as ballast-coils, transformer-plates, and the like.

The object of my invention is to produce an improved material of this character having specially high permeability and electrical resistance and low hysteresis qualities. I have found that material of these desirable qualities can be produced by alloying iron with other elements, among which I will name silicon and aluminium, phosphorus also yielding satisfactory results, as well as combinations of two or three of these elements.

I may proceed, for instance, as follows: I take pure Swedish or other suitable pure iron and melt this in a common crucible or electrically along with silicon or aluminium or phosphorus, employing a percentage of these additions varying from one-quarter of one per cent. to five per cent. As above stated, I may employ only one of the three elements mentioned or two of them, or all three. Instead of the crucible process I may employ the decarbonized or desiliconized iron produced by any steel-making process—such as the open hearth, the pneumatic, or the electrical process—adding to such iron the desired percentage of silicon, aluminium, or phosphorus. The molten alloy is poured into suitable ingots which are, if desired, forged or rolled into the desired shape.

As an example of the exact composition of alloy produced I will refer to one actually manufactured by me, which contained 2.75 per cent. silicon, .07 per cent. carbon, .08 per cent. manganese, .03 per cent. sulfur, .03 per cent. phosphorus.

The material produced as above described is valuable on account of its high magnetic permeability, its high electrical resistance, and low hysteresis for efficient use in transformers and other electrical apparatus in which said qualities are useful.

I have found that the superior qualities of my improved material of alloy can be still further enhanced by a treatment involving alternate heating and cooling and generally carried out as follows: I first heat the material to between about 900° and 1,100° centigrade and allow it to cool, preferably quickly. Then I reheat the material to between about 700° and 850° centigrade—that is, to a temperature lower than the one attained during the first heating—and then allow the metal to cool very slowly. In practice the cooling has been often extended to last several days. Either one or both of these treatments may be frequently repeated, or after the first treatment has been carried out the second type of heating may be frequently repeated. I have for instance, taken a steel alloy of the composition above mentioned heated it to 1,070° centigrade, cooled it quickly to atmospheric temperature, reheated it to 750° centigrade, cooled slowly, again reheated to 800° centigrade, and again cooled slowly. I have found that when the best results are desired it is of great importance to use the exact temperatures that correspond to these results, and careful pyrometer readings should be taken for this purpose. I have also found it important to keep the percentage of elements, such as carbon and manganese, which are not used for the purpose of my invention as low as possible—say carbon under about .12 per cent. and manganese under about .12 per cent. This, of course, is to be understood as a statement of conditions to be observed when the best results are desired.

It will be seen that by my invention a certain proportion of pure iron is replaced with a body such as silicon, aluminium, or phosphorus, which are materials of low magnetic properties or so-called "non-magnetic" materials. This addition has a very remarkable effect on the magnetic permeability, the electrical resistance, and the hysteresis quality of the alloy produced. In fact, the improved alloy has a higher magnetic permeability and a lower hysteretic constant than any magnetic body of which I could obtain data, including the purest iron I could obtain. This remarkable result may be due to the strong chemical affinities of the aluminium, silicon, or phosphorus for oxygen and the halogens. Whatever the reason of the superiority of my alloy may be, the fact of this superiority has been well established and in itself furnishes a test for the identification of the magnetic body made according to my invention.

I desire it to be understood that aluminium and phosphorus and their combinations with each other or with silicon are to be considered equivalents of silicon for the purposes of my invention, as well as any other element or combination of elements which will produce the same result—to wit, a greater magnetic permeability, a higher electrical resistance, and a lower hysteresis quality than is exhibited by the purest commercial iron obtainable. The claims as hereunto appended while mentioning only silicon are to be understood as covering these equivalents.

I claim as my invention:—

1. A magnetic material containing iron with an admixture of from one to five per cent of silicon, and treated by heat to at least between 700° and 850° C. said treated material having magnetic permeability and electrical resistance increased and the hysteresis quality decreased to figures above and below respectively those which obtain with the purest iron commercially obtainable.

2. A magnetic material containing iron with from one to five per cent. of silicon and showing a magnetic permeability and an electrical resistance higher, and a hysteresis action lower than the purest iron commercially obtainable.

3. The herein-described process of producing a magnetic material of high permeability and low hysteresis action, which consists in alloying a magnetic body with silicon, heating the alloy to between about 900° and 1,100° centigrade, allowing it to cool, and then reheating it to between about 700° and 850° centigrade, and thereupon allowing it to cool slowly.

4. The herein-described method of producing a magnetic material of high permeability and a low hysteresis action, which consists in alloying a magnetic body with silicon, heating the alloy to a relatively high temperature below its melting-point, allowing the alloy to cool, reheating it to a temperature below that first employed, and allowing it to cool slowly.

5. The herein-described process of producing a magnetic material of high permeability and low hysteresis action which consists in alloying a magnetic body with from one to five per cent. of silicon, heating the resulting mixture to a relatively high temperature below its melting point, allowing it to cool, reheating it to a temperature below that first employed, and then allowing it to cool slowly.

In testimony whereof I have signed my name to this specification in the presence of two subscribing witnesses.

ROBERT ABBOTT HADFIELD.

Witnesses:
GEORGE H. SONNEBORN,
E. M. HOPLER.